Oct. 12, 1943.   H. A. THOMPSON   2,331,815
CODED TRACK CIRCUIT FOR RAILWAY CAB SIGNAL CONTROL
Filed Dec. 22, 1942   3 Sheets-Sheet 1
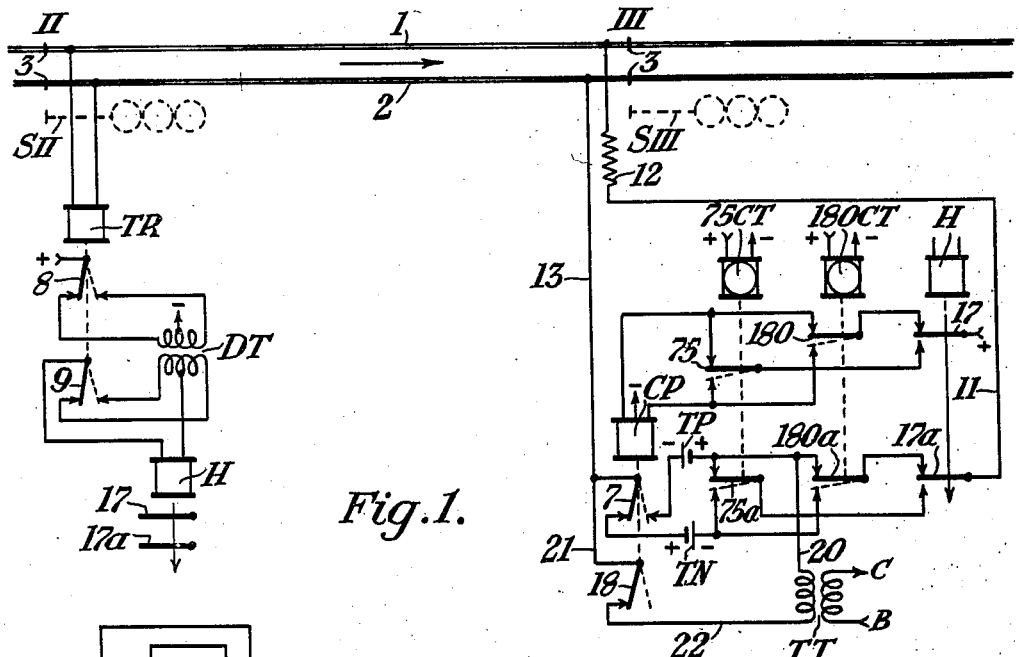
Fig. 1.
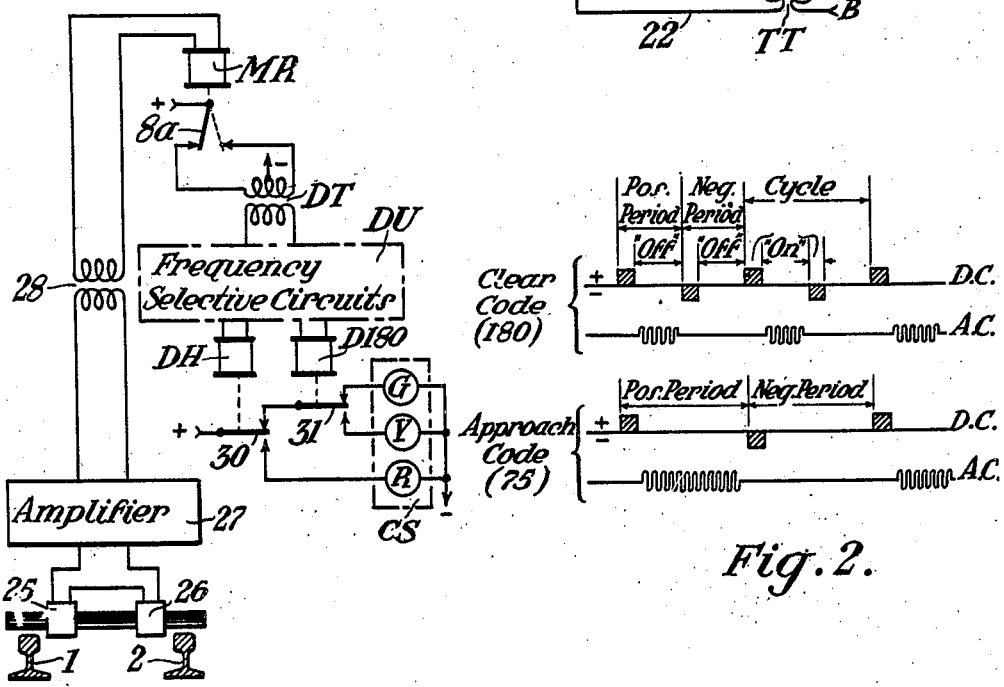
Fig. 2.
Fig. 3.
INVENTOR
Howard A. Thompson
BY
HIS ATTORNEY Oct. 12, 1943. H. A. THOMPSON 2,331,815
CODED TRACK CIRCUIT FOR RAILWAY CAB SIGNAL CONTROL
Filed Dec. 22, 1942 3 Sheets-Sheet 2
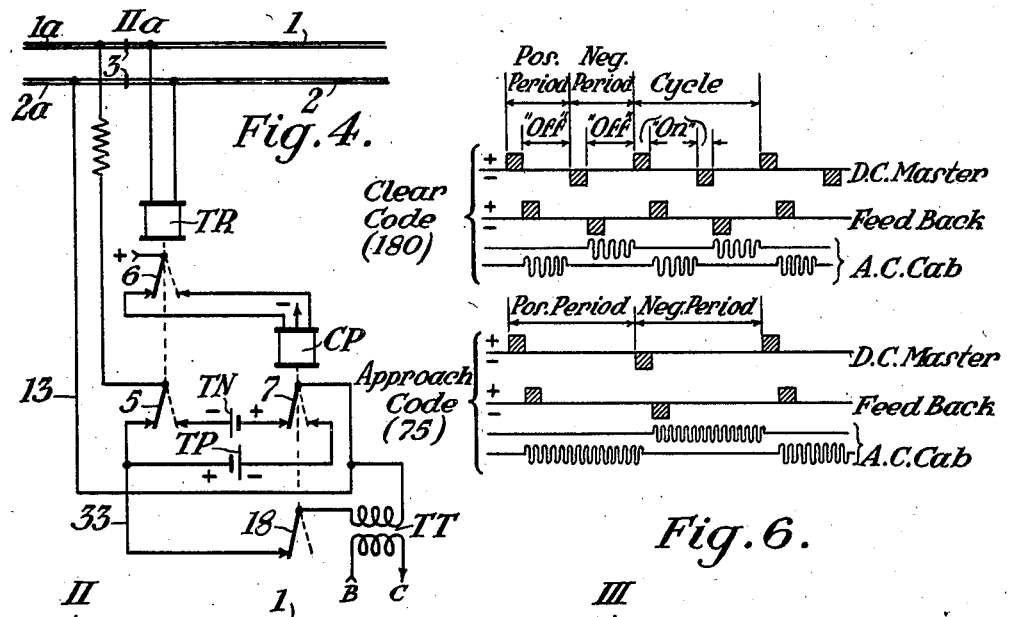
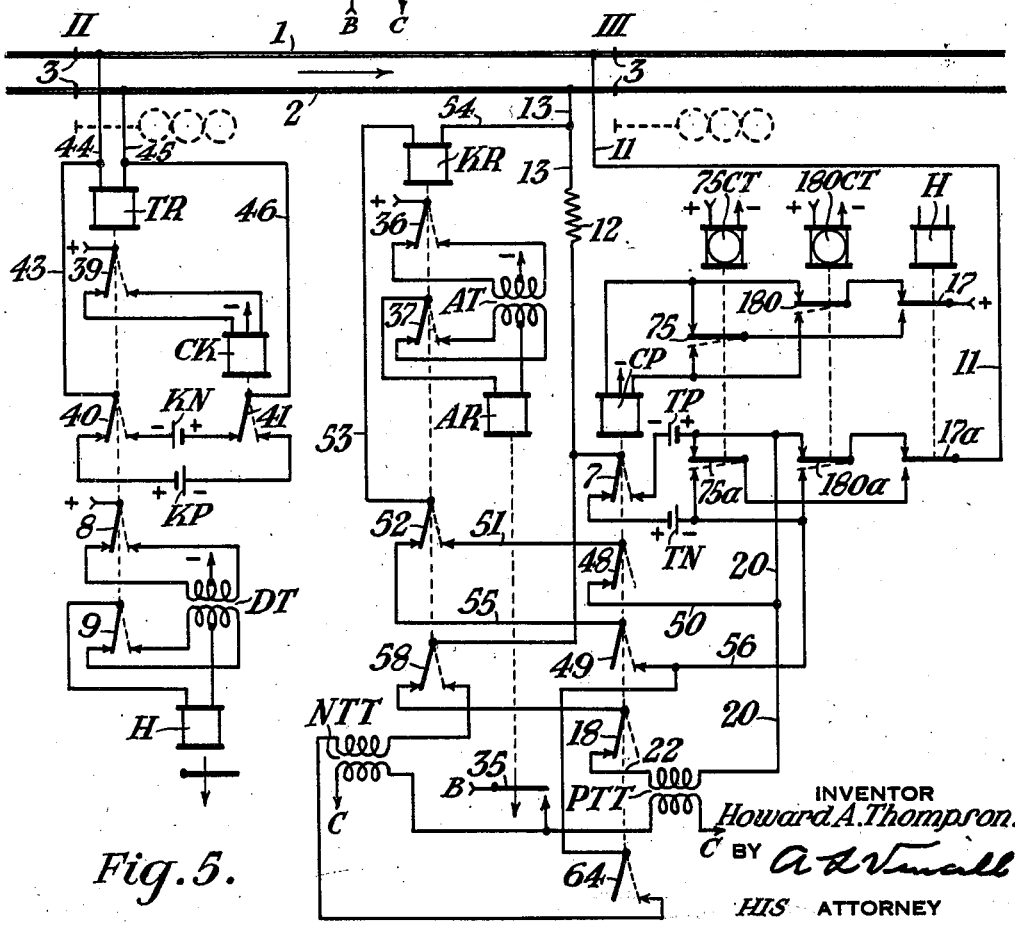
INVENTOR
Howard A. Thompson.
BY
HIS ATTORNEY Oct. 12, 1943.   H. A. THOMPSON   2,331,815
CODED TRACK CIRCUIT FOR RAILWAY CAB SIGNAL CONTROL
Filed Dec. 22, 1942   3 Sheets-Sheet 3
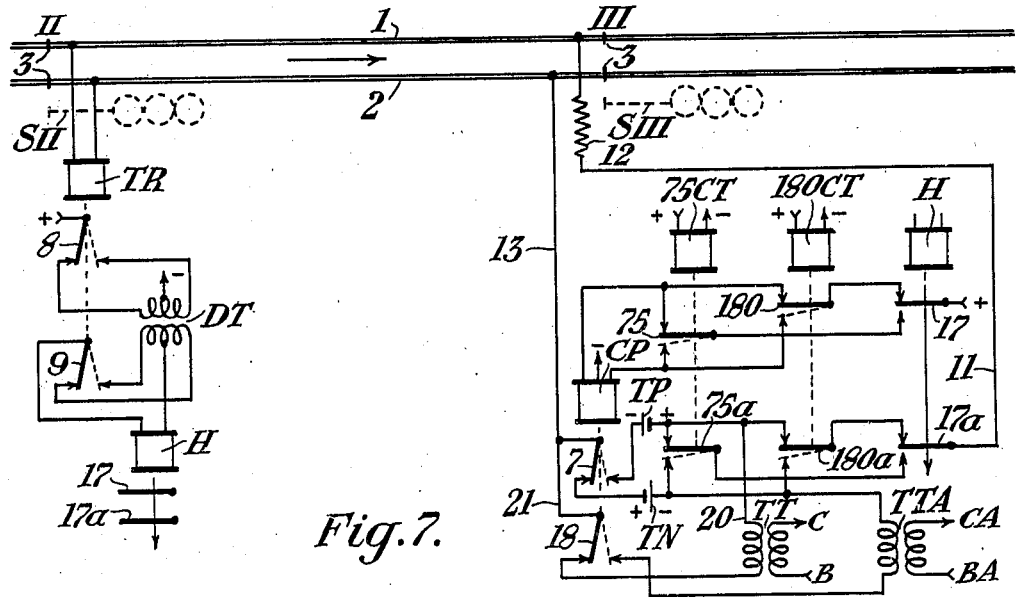
Fig. 7.
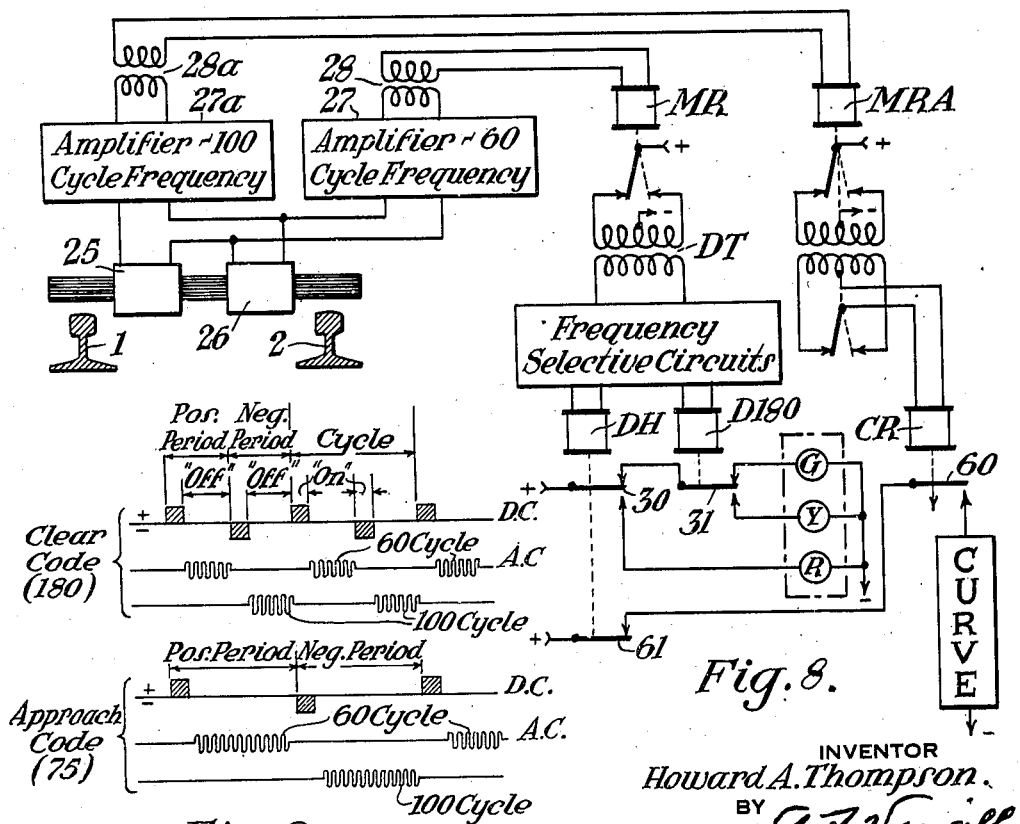
Fig. 8.
Fig. 9.
INVENTOR
Howard A. Thompson
BY
HIS ATTORNEY Patented Oct. 12, 1943

2,331,815

UNITED STATES PATENT OFFICE 2,331,815

CODED TRACK CIRCUIT FOR RAILWAY CAB SIGNAL CONTROL

Howard A. Thompson, Edgewood, Pa., assignor to The Union Switch & Signal Company, Swissvale, Pa., a corporation of Pennsylvania Application December 22, 1942, Serial No. 469,789

9 Claims. (Cl. 246—63)

My invention relates to coded track circuits for use in systems of railway signaling and it has special reference to the employment by such track circuits of coded alternating current energy that is suitable for the control of train carried cab signals and that supplements coded direct current energy which operates system track relays in the "polar impulse" manner of assignee's Patent No. 2,282,099 isssused to me on May 5, 1942.

Generally stated, the object of my invention is to supplement the direct current "polar impulse" track circuits of my Patent 2,282,099 by alternating current energy supply means which provide for the coded control of cab signals in addition to or instead of wayside signals.

A more specific object is to provide for polar impulse track circuits of the "frequency code" signaling system type an improved organization wherein alternating current energy for cab signal control is applied to the rails between successive pulses of the direct current energy by which the system track relays are operated.

I shall describe four forms of "polar impulse" coded track circuits which embody my invention and shall then point out the novel features thereof in claims. These illustrative embodiments are disclosed in the accompanying drawings in which:

Fig. 1 is a diagrammatic representation of a polar impulse track circuit that incorporates the alternating current energy supply improvements of my invention and that provides for the "frequency code" control of train carried cab signals;

Fig. 2 illustrates "clear" and "approach" codes for the track circuit of Fig. 1 and identifies both the direct current and the alternating current energy pulses of which those codes are made up;

Fig. 3 shows train-carried cab signaling apparatus which may be controlled by the trackway equipment of Fig. 1;

Fig. 4 shows apparatus suitable for repeating both the direct current and the alternating current energy pulses around the insulated joints of a cut-section in track circuits of the Fig. 1 type;

Fig. 5 reproduces the cab signal control track circuit of Fig. 1 and shows "coded feed back" supplements thereto by which the supply of alternating current trackway energy is approach governed without the aid of line wires;

Fig. 6 shows "clear" and "approach" codes for the track circuit of Fig. 5 and identifies the character of the energy pulses of which those codes are made up.

Fig. 7 shows apparatus of the type shown in Fig. 1 but modified to provide for the supply of impulses of alternating current cab signal energy of two different frequencies to provide an additional cab signal indication;

Fig. 8 shows train-carried cab signaling apparatus which may be controlled by the trackway equipment of Fig. 7; and Fig. 9 is a diagram showing the code pattern of the energy supplied to the rails of a section equipped with the track circuit of Fig. 7.

In the several views of the drawings like reference characters designate corresponding parts.

Referring first to Fig. 1, the improved track circuit organization of my invention is there disclosed as forming a part of a "cab signal only" system of automatic block control for a railway track 1—2 over which it will be assumed that traffic moves in the single direction indicated by the arrow, or from left to right in the diagram. The protected stretch of this track is divided into the customary successive sections by insulated rail joints 3 and the rails of each section form a part of a coded track circuit of the "polar impulse" type.

Coded "polar impulse" track circuit using direct current

In this view of Fig. 1, reference characters II and III respectively designate the entrance and the exit ends of one of these track sections. This particular section is illustratively shown as being a full signal block in length and it is equipped with direct current "polar impulse" code facilities which duplicate those shown in Figs. 1 and 4 of my earlier identified United States Patent No. 2,282,099.

At the exit location III those facilities utilize a source of positive polarity energy TP and a source of negative polarity energy TN; "clear" and "approach" code transmitters 180CT and 75CT having contacts 180—180a and 75—75a which repeatedly pick up and release at the rates of 180 and 75 times per minute; a code detecting relay H having a contact 17a which when picked up causes "clear" transmitter contact 180a to connect in recurring code pulse manner the section rails first with the positive source TP and then with the negative source TN and which when released causes "approach" transmitter contact 75a to effect similar rail-to-source connections; and a repeater relay CP energized over "clear" coder contact 180 when device H is picked up and over "approach" coder contact 75 when device H is released and having a contact 7 which shortens the pulses of both positive and negative direct current that are impressed upon the section rails.

At the entrance location II the "polar impulse" facilities utilize a track relay TR of the "polar stick" code following type which has its winding connected across the rails and which holds its contacts to the left during each positive polarity pulse of winding received energy and to the right during each negative polarity pulse of the received energy; a decoding transformer DT which receives primary current under the control of a pole changing contact 8 of the track relay; and a code detecting relay H which is of the direct current delayed release type and which is energized from the decoding transformer secondary over a rectifying contact 9 of the track relay.

The earlier described exit end or location III apparatus operates in the following manner. With the track section in advance of location III vacant, contacts 17—17a of relay H assign "clear" transmitter contacts 180—180a to the driving circuit of repeater relay CP and to the energy supply circuits for the section rails 1—2. As already stated, these "clear" coder contacts 180—180a repeatedly pick up and release at the high speed or 180 code rate.

Each such pick-up produces a "positive" period in the "clear D. C." code pattern that is represented in Fig. 2. During the energy pulse which defines that period, source TP maintains rail 1 positive with respect to rail 2. This is done over a connection extending from the positive terminal of source TP through front contact 180a of device 180CT, front contact 17a of device H, a current limiting impedance 12, the track rails 1 and 2, conductor 13, and contact 7 of device CP in its right position (shown dotted) back to the negative terminal of source TP.

Upon each release of transmitter contacts 180—180a there is produced a "negative" period in the "clear D. C." code pattern of Fig. 2. During the energy pulse which defines that period the negative source TN maintains rail 2 positive with respect to rail 1. This is done over a connection extending from the positive terminal of source TN through contact 7 of relay TP in its left position (shown in full lines), conductor 13, track rails 2 and 1, impedance 12, conductor 11, front contact 17a of device H, and back contact 180a of transmitter 180CT back to the negative terminal of source TN.

As the specification of my United States Patent 2,282,099 more fully explains, the repeater relay CP is a code following device of the "polar stick" or magnetically toggled type. Flow of energy over the code transmitter's front contact 180 (or 75) through the left portion of its winding moves contact 7 to the left position, while flow of energy over the code transmitter's back contact 180 (or 75) through the right portion of the relay winding shifts contact 7 to the opposite or right position. Once, moreover, contact 7 reaches either of these two positions it there remains continuously until the winding of relay CP receives energy of the opposing polarity.

Hence: (1) each back contact closure by transmitter 180CT causes the repeater device CP to shift its contact 7 from the left to the right position; and (2) each front contact closure by transmitter 180CT causes relay CP to shift contact 7 from its right position back to the left position. Each of these shifts is accompanied by a short delay during which each of the rail supply circuits earlier traced is completed. In consequence, the recurring pulses of positive polarity energy supplied from source TP are rendered much shorter than the recurring code periods which those pulses define and the intervening pulses of negative polarity energy from source TN likewise are rendered much shorter than the intervening code periods which those pulses define.

In the "clear" code pattern of Fig. 2 each of the above named "on" energy pulses has been represented as persisting for only about one-fourth of the code period ("positive" or "negative") defined thereby. The remaining three-fourth thus becomes an energy "off" portion of the period. Other relative lengths of the "on" and "off" portions of the code period are, of course, possible and of such other relative lengths the "approach" code pattern of Fig. 2 is representative.

In being transmitted over the section rails to entrance location II, each positive polarity pulse of the so supplied energy causes the track relay TR to move its contacts to the left and each negative polarity energy pulse causes the relay to shift its contacts to the right. Each of these shifts takes place rapidly and requires only a short application of energy to the relay winding. Track relay TR thus is operated in exactly the same manner as were each of the positive pulses of trackway energy to be prolonged for the full duration of the "positive" code periods and each of the negative pulses to be prolonged for the full duration of the "negative" code periods.

In the entrance end organization shown, such a code following operation by the track relay TR causes the detector relay H to hold its contacts continuously picked up regardless of whether that operation be at the high speed or 180 "clear" code rate, or at the low speed or 75 "approach" code rate. In either event, the winding of relay H receives (from source terminals "plus" and "minus" and through transformer DT) code frequency pulses of energizing current which hold contacts 17—17a picked up.

From the foregoing description of the "polar impulse" coded track circuit apparatus of Fig. 1, it is apparent that a three indication automatic block signaling system may be provided by equipping each of a plurality of consecutive track sections with this Fig. 1 apparatus and arranging that the entrance end relay H of each section determine (by means of contacts 17—17a as shown at location III) the rate of pulse recurrence of the direct current trackway energy this is supplied to the exit end of the rear adjoining section.

My earlier identified United States Patent No. 2,282,099 proposes systems of this direct current "polar impulse" track circuit type wherein the automatic block indications are displayed by wayside signals such as the dotted outlines of this application's Fig. 1 show at S. In such wayside systems each such signal S has its indication controlled by the track relay TR at the same location and it displays: (1) "clear" when that relay follows code at the 180 or high speed rate; (2) "approach" when track relay TR follows code at the 75 or low speed rate; and (3) "stop" when relay TR fails to follow code.

*Cab signal control by alternating current*

While eminently satisfactory for the control of wayside signals, the coded "polar impulse" direct current track circuits which United States Patent 2,282,099 shows are incapable of operating train-carried cab signaling apparatus of conventional "frequency selective" character, such as Fig. 3 of this application represents. Such cab signal control frequently is desirable and the present invention makes track circuits of the "polar impulse" type, shown in United States Patent 2,282,099 and here reproduced by Fig. 1, capable of providing it.

This provision takes the form of alternating current energy supply facilities uniquely combined with the already described direct current code supply apparatus at Fig. 1's location III. As there represented these facilities include a track transformer TT through which energy from an alternating current source B—C of 60 cycle per second or other commercial carrier wave frequency is at proper times impressed upon the section rails over a contact 18 of the code repeater device CP.

Such impression of alternating current energy is correlated with the cycles of direct current "polar impulse" code in the manner indicated by Fig. 2. During the "off" portion of each "positive" period of those direct current code cycles Fig. 2 shows that "A. C." energy is applied to the rails.

This "A. C." energy is derived from the alternating current source B—C through a track transformer TT whose primary is constantly connected to that source. It is impressed upon the section rails over a circuit extending from the upper terminal of transformer TT's secondary through conductor 20, the front point of one or the other code transmitter contacts 180a and 75a, either the front or the back point of relay H's code selector contact 17a, conductor 11, rails 1 and 2, conductors 13 and 21, repeater relay CP's contact 18 in its left position and conductor 22 back to the lower terminal of transformer TT's secondary.

When location III's relay H is picked up, contact 17a thereof includes the "clear" code transmitter contact 180a in the rail supply circuit above traced; when, however, relay H is released, contact 17a causes the "approach" code transmitter contact 75a to be included in that alternating current supply circuit.

In either event, "A. C." cab signal control energy from source B—C starts to be applied to the rails just after the end of each "positive" polarity energy pulse of the direct current code and continues in this application until just before the beginning of the succeeding "negative" polarity pulse of the direct current code energy. The stated beginning of each "A. C." pulse is marked by a left closure of code repeater relay CP's contact 18; the stated ending of the same pulse is marked by a subsequent movement of the selected code transmitter contact 180a or 75a out of its front position.

Both of these actions were earlier examined re Fig. 1's supply of direct current "polar impulse" code. In my alternating current supply facilities of Fig. 1 their combined effect is to produce the "A. C." trackway codes that are shown in Fig. 2. Of these the "clear A. C." code consists of recurring pulses of alternating current trackway energy in the number of 180 per minute, and the "approach A. C." code consists of recurring pulses of alternating current rail energy in the number of 75 per minute.

Like the "D. C." codes which they supplement, these two "A. C." codes thus are respectively characterized by energy pulse recurrence rates of high speed and of low speed; the 180 "clear" or high speed code is impressed upon the rails only when the track section ahead of location III is vacant; and the 75 "approach" or low speed code is supplied to the rails only when the track section ahead of location III is occupied.

By these "A. C." codes of Figs. 1–2 train-carried cab signaling apparatus of the conventional character shown in Fig. 3 may be operated. That apparatus will be recognized as embodying "frequency selective" principles more completely described by assignee's United States Patent No. 1,773,472 to Paul N. Bossart.

In these cab signal control circuits of Fig. 3, use is made of the usual pick-up windings 25—26 mounted on the locomotive front; an amplifier 27 that strengthens the energy which these windings inductively receive from the track rails 1—2; a code following master relay MR which is energized through a transformer 28 by a measure of the output of this amplifier and which responds to each pulse of received trackway energy having the alternating current character supplied from source terminals B—C of Fig. 5; a decoding transformer DT which is supplied with code step pulses of exciting current over a pole changing contact 8a of the master relay; frequency selective circuits DU into which the decoding transformer feeds its output energy; decoding relays DH and D180 which receive pick-up current from those frequency selective circuits; and a cab signal CS having a plurality of indicating units which are selectively energized under the control of the decoding relays.

The elements just named cooperate in such a way that: (1) when the master relay MR follows alternating current trackway code of the 180 pulse per minute variety both of the decoding relays DH and D180 pick up and light (over front contacts 30—31) the green or "clear" indication lamp G of the cab signal S; (2) when the master relay follows alternating current trackway code of the 75 pulse per minute variety only the first decoding relay DH picks up and front contact 30 plus back contact 31 then completes the lighting circuit for the yellow or "approach" indication lamp Y of the signal; and (3) when the master relay ceases to follow code and holds contact 8a continuously in one position both of the decoding relays release and light (over back contact 30) the red or "stop" indication lamp of the cab signal.

My improved trackway organization of Fig. 1 supplies the rails of section II—III with the coded alternating current energy which is required to operate the cab signal apparatus of Fig. 3 and it does this without in any way interfering with the desired or safe operation of the direct current "polar impulse" portions of that organization.

*Cut-section facilities of Fig. 4*

In certain instances it may be desirable to subdivide the main signal block II—III of the Fig. 1 system into two or more track sections. Typically such subdivisions will be occasioned by requirements of excessive block length, highway crossing control, or other equally well-known reasons.

In the event of such subdivisions means must be provided for repeating into the rails of each rear section both the direct current and the alternating current energy pulses that are supplied to the rails of each forward section. In a system of the type shown in Fig. 1, moreover, all repeated pulses must not only have the same timing as the received pulses by which they are occasioned but the repeated and received direct current pulses must also coincide as to energy polarity.

Facilities for performing such code repeating functions are illustrated in Fig. 4. There a block subdividing or cut-section location IIa is shown as being occasioned by insulated rail joints 3 which are interposed between the entrance and exit locations of a signal block having the character represented at II—III in Fig. 1.

Operated by "polar impulse" direct current code energy that is received from the forward section rails 1—2 is a code following track relay TR of the "polar stick" type described for Fig. 1; repeating the positional changes of device TR's contact 6 is a relay CP which may duplicate Fig. 1's "polar stick" device of similar identification; supplying the rear section rails 1a—2a with direct current energy pulses over contacts 5 and 7 of devices TR and CP are positive and negative track batteries TP and TN; and supplying those same rear section rails with alternating current energy pulses over device CP's contact 18 is a transformer TT and an energy source B—C.

Each pulse of positive polarity master code energy that is received from the forward section rails at location IIa causes Fig. 4's track relay TR to position its contacts 5—6 to the left. At the beginning of each of these positionings contacts 7—18 of repeater relay CP are to the right. In consequence, source TP supplies the rear section rails 1a—2a with a pulse of positive polarity energy. This supply is from the positive terminal of source TP over device TR's left contact 5, impedance, rear section rails 1a—2a, conductor 13, and device CP's right contact 7 back to the negative terminal of source TP.

Very shortly repeater relay CP follows track relay TR'S contact shift to the left and the positive polarity pulse of rear section direct current energy then is interrupted at contact 7. This interruption is closely followed by a supply to the rear section rails of an alternating current energy pulse having the character shown at "A. C." in Fig. 2. This supply is from source B—C, through Fig. 4's transformer TT, and over a circuit extending from the lower terminal of TT's secondary, through device CP's left contact 18, conductor 33, device TR's left contact 5, impedance 12, rear section rails 1a—2a, and conductor 13 back to the upper terminal of TT's secondary.

This "A. C." pulse of rear section energy continues until a negative pulse of direct current energy is received from the forward section rails. When that happens Fig. 4's track relay TR shifts its contacts to the right and thereby causes contact 5 to interrupt the alternating current supply circuit just traced above.

In so shifting its contacts to the right track relay TR connects the negative direct current source TN in energy supplying relation with the rear section rails. This connection is from the positive terminal of source TN through device CP's left contact 7, conductor 13, rear section rails 2a—1a, impedance 12, and device TR's right contact 5 back to the negative terminal of source TN.

Very shortly repeater relay CP follows track relay TR's contact shift to the right and the negative polarity pulse of rear section direct current energy then is interrupted at contact 7.

Later reception from the forward section rails of another positive polarity pulse of direct current energy causes the above described cycle of actions to be repeated and in this way the cut-section apparatus of Fig. 4 functions in the desired manner previously explained.

"Coded feed back" track circuit of Fig. 5

Coded track circuits of the polar impulse "D. C.—A. C." type just described provide a most desirable form of automatic block control for cab signals of the conventional "frequency code" type shown in Fig. 3.

In many instances it is desirable to approach govern the supply of alternating current cab signal control energy. To meet this need I have evolved the non-line-wire approach control combination which in one preferred form is further shown by the diagram of Fig. 5.

This combination utilizes the "coded feed back" operating principle of assignee's United States Patent 2,021,944 to Nicholson and the Fig. 5 form thereof requires that the Fig. 1 "polar impulse" track circuit combination earlier described be supplemented by certain apparatus which will now be named.

At Fig. 5's exit location III this supplemental apparatus includes: (1) an approach relay AR having a contact 35 which keeps transformers PTT and NTT deenergized at all times except when a train approaches the transformer location over the rails of section II—III; (2) a detector relay KR which controls the energization of relay AR through the medium of contacts 36—37 and an interposed transformer AT; and (3) circuits over which the winding of relay KR is connected in energy receiving relation with the section rails 1—2 during the energy "off" portions of the D. C. "polar impulse" codes. In Fig. 6 these codes are designated by the term of "D. C. master."

At Fig. 5's entrance location II, the supplemental apparatus includes: (1) a source of positive polarity "feed back" energy KP and a source of negative polarity feed back energy KN; (2) a repeater device CK for track relay TR which is energized over that relay's contact 39; and (3) circuits including contacts 40—41 of devices TR—CK over which sources KP and KN are selectively connected with the section rails 1—2 during the "off" portions of the master code positive and negative periods.

Entrance end relay CK has response characteristics similar to those earlier explained for the exit end repeater CP. Flow of current over device TR's left contact 39 through the left portion of relay CK's winding causes contact 41 to move to its left position; similarly, flow of current over relay TR's right contact 39 through the right portion of relay CK's winding causes contact 41 to shift to its right position.

Each such shift is accompanied by a short period of response delay during which one or the other of the "feed back" sources KP—KN is connected with the section rails. As a result those rails are supplied with intervening pulses of "feed back" energy that have positive and negative polarities in alternating sequence and that are of short individual duration.

The character of these "feed back" pulses will best be understood upon reference to Fig. 6. From this figure it will be seen that each positive pulse of "master code" energy is followed by a positive pulse of "feed back" energy and that each negative pulse of "master code" energy is followed by a negative pulse of "feed back" energy.

The manner in which these feed back pulses are supplied will now be explained. Under vacant conditions of track section II—III, Fig. 5's track relay TR moves its contacts 39—40 from their left to their right and from their right to their left positions repeatedly and in respective step with the pick-ups and releases of the active code transmitter contact 180 or 75 at the section exit. At times this contact movement thus takes place at the high speed or 180 code rate and at other times at the low speed or 75 code rate.

In either case, each left positioning of relay TR's contacts 39—40 is followed after a brief time interval by a transfer of repeater device CK's contact 41 from its right to its left position. Similarly, each movement of the track relay TR's contacts 39—40 to their right positioning is followed after a brief interval by a transfer of repeater device CK's contact 41 from its left to its right position.

Upon each left positioning of the track relay contacts by a pulse of positive polarity "master code" energy the section rails are supplied with a positive polarity pulse of feed back energy. This supply is over a circuit which extends from the positive terminal of feed back source KP through device TR's left contact 4, conductors 43—44, section rails 1—2, conductors 45—46, and device CK's right contact 41 back to the negative terminal of source KP.

This positive feed back supply continues for the relatively short time (see Fig. 6) that is required for device CK to open its right contact. The direction of feed back current flow through the winding of track relay TR is, moreover, such as to continue contacts 39—40 in their left positions.

Upon each right positioning of the track relay contacts by a pulse of negative polarity "master code" energy, the track rails are supplied with a negative polarity pulse of "feed back" energy. This supply is over a circuit extending from the positive terminal of source KN through device CK's left contact 41, conductors 46—45, section rails 2—1, conductors 44—43 and device TR's right contact 40 back to the negative terminal of source KN.

Completion of that circuit continues only for the relatively short time (again see Fig. 6) required by relay CK to shift contact 41 away from its left position. During the negative feed back pulse which precedes that shift the direction of feed back current flow through track relay TR is, moreover, such as to continue contacts 39—40 in their right positions.

In the manner just stated, therefore, each response of the track relay TR to a positive pulse of "master code" energy causes the rails to be supplied with a positive pulse of "feed back" energy, and each response of the track relay to a negative pulse of "master code" energy causes the rails to be supplied with a negative pulse of "feed back" energy. This relation is clearly shown in Fig. 6.

As Fig. 6 further shows, the thus supplied pulses of feed back energy recur in step with the "off" portions of the positive and negative master code periods. In being transmitted to the section exit end III they are impressed upon the winding of the detector relay KR.

This detector relay is a code following device of the "polar stick" or magnetically toggled type. Flow of current through the relay winding in the direction of from right to left effects a right positioning of the relay contacts 36—37, while flow of current through the relay winding in the opposite direction effects a left positioning of those contacts. Once, moreover, the contacts reach either of these positions they there remain continuously until the relay winding is energized in the opposing direction.

In the particular connection shown: (1) each winding received pulse of positive polarity "feed back" energy flows relay current in the right-to-left direction and thereby operates contacts 36—37 to their right position, as illustrated in full lines; and (2) each winding received pulse of negative polarity "feed back" energy flows relay current in the left-to-right direction and thereby operates contacts 36—37 to the left, as shown in dotted lines.

Looking first at the "positive" feed back pulses, it has already been seen that each such pulse makes rail 1 positive with respect to rail 2 and is accompanied by a closure of the active coder CT's front contact 180a or 75a plus a closure of relay CP's left contacts 7—18—48—49. In appearing between the rails at the exit location III such positive feed back potential thus energizes detector relay KR over a path extending from rail 1 through conductor 11, contact 17a of device H, the front point of the active coder contact 180a or 75a, conductors 20 and 50, device CP's left contact 48, conductor 51, device KR's right contact 52, conductor 53, the winding of relay KR, and conductors 54 and 13 back to rail 2.

By the resulting feed back current which flows left to right through the winding of relay KR, the contacts of that relay are shifted from the right to the left. Relay KR has a "jump action" form of response and in consequence the named shift completes itself even though the energizing circuit which produced it becomes broken when contact 52 leaves its right position.

Looking next at the "negative" feed back pulses, it has already been seen that each such pulse makes rail 2 positive with respect to rail 1 and is accompanied by a closure of the active coder CT's back contact 180a or 75a plus a closure of relay CP's right contacts 7—18—48—49. In appearing between the rails at the exit location III such negative feed back potential thus energizes detector relay KR over a path extending from rail 2 through conductors 13 and 54, the winding of relay KR, conductor 53, device KR's right contact 52, conductor 55, device CP's right contact 49, conductor 56, the back point of the active coder contact 180a or 75a, contact 17a of device H, and conductor 11 back to rail 1.

By the resulting feed back current which flows right to left through the winding of relay KR, the contacts of that relay are shifted from the left to the right. Because of relay KR's "jump action" form of response this shift completes itself even though the energizing circuit which produced it becomes broken when contact 52 leaves its left position.

As long, therefore, as Fig. 5's track section II—III remains vacant: (1) recurring pulses of positive and negative polarity feed back energy are received from the rails at the location of relay KR; (2) that relay is by each of those positive pulses caused to move its contacts to the left and by each of those negative pulses caused to move its contacts to the right; and (3) in that way the detector relay KR is operated in code following manner by feed back pulses which are transmitted thereto from entrance sources KP—KN.

Nor is this action in any way interferred with by pulses of "master code" energy with which the rails are supplied by sources TP—TN at the detector relay location. Positive polarity pulses of master code energy from source TP are prevented from reaching the winding of relay KR by contact 48 of device CP and negative polarity master code pulses from source TN are similarly kept away from relay KR by device CP's contact 49. In each instance relay KR's winding is by the named contact of device CP kept disconnected from the section rails during the full "on" period of master code energy supply.

Detector relay KR, accordingly, is responsive to, and only to, feed back energy that is received over the rails from entrance sources KP—KN. Code following operation on the part of detector relay KR thus can occur only when Fig. 5's track section II—III is vacant.

Such operation results in the approach relay AR receiving recurring pulses of energizing current which hold contact 35 continuously picked up. This approach relay AR is of the direct current type and contact 35 thereof is sufficiently slow in releasing to assure the named continuous pick-up during code following operation of relay KR.

Any suitable form of approach relay energizing circuit may, of course, be used. In the arrangement of Fig. 5 the approach relay pick-up current originates in source "plus"—"minus," and is transmitted to the relay through pole changing contact 36 of device KR, an interposed transformer AT, and rectifying contact 37 of device KR. In this combination relay AR can receive energizing current only if the detector device contacts 36—37 are recurrently shifting between their right and left positions. Stoppage of those contacts in either position results in a complete deenergization of relay AR and the resultant release of its contact 35.

By such release any desired form of approach energization may, of course, be performed. As illustratively shown in Fig. 5, contact 35 maintains cab signal supply transformers PTT and NTT disconnected from its energizing source B—C when picked up and completes the transformer energizing connection when and only when released.

The mode of operation of Fig. 5's "coded feed back" approach control facilities will have become apparent from the foregoing description of the entrance and exit end apparatus which the Fig. 5 track circuit utilizes. At all times the continuously operating coder and repeater devices CT—CP connect the section rails 1—2 alternately with the positive and negative exit end sources TP and TN and thereby produce a "D. C. master code" of the character shown in Fig. 6. This master code is of the "clear 180" variety when the track section ahead of location III is vacant and of the "approach 75" variety when that advance section is occupied.

In being received at the section entrance, the energy pulses of this master code operate track relay TR in conventional code following manner. Aided by repeater device CK, that relay alternately connects the section rails 1 and 2 with the positive and negative polarity sources KP and KN and thereby produces a "feed back" code having the "polar impulse" character that also is represented in Fig. 6. From that figure it will be noted that each feed back pulse closely follows a master code pulse and persists only for the early portion of the master "off" period during which it occurs.

It being received at the exit location III, the energy pulses of this feed back code operate detector relay KR in the code following manner earlier described. As a result of such operation, the approach relay AR holds contact 35 continuously picked up and thereby maintains cab signal supply transformer TT normally deenergized.

Such deenergization continues as long as Fig. 5's track section II—III remains vacant. Under this condition, of course, there is no need for impressing alternating current cab signal control energy upon the section rails and the drain on source B—C thus is conserved.

In the event now that a train comes into the section, the usual shunting action of its wheels and axles cuts off transmission of "master code" energy to the entrance end track relay TR and also discontinues transmission of "feed back" energy to the exit end detector relay KR. In consequence, relay KR ceases to shift the position of contacts 36—37 but it allows those contacts to remain in the position to which they were last energized.

As a result, transformer AT now discontinues all transmission of pick-up energy to relay AR and causes that relay to release contact 35. That release, of course, connects track transformers PTT and NTT with their energizing source B—C, and thereby causes the rails further to be supplied with pulsed alternating current energy which is suitable for the control of train-carried cab signals of the Fig. 3 type. The circuits over which such supply takes place will be described presently.

The named release of approach relay AR continues until the train moves out of Fig. 5's section II—III. When that happens, master code energy is again transmitted to entrance end track relay TR, the section rails are once more supplied with feed back pulses, and by those pulses the exit end detector relay KR is again operated in code following manner. By that operation, the detector relay contacts 36—37 restore the supply of pick-up current to the approach relay AR. That relay, in turn, again picks up contact 35 and restores the cab signal supply transformer TT to its normally deenergized condition.

*Cab signal supply circuits of Fig. 5.*

The Fig. 5 circuits over which alternating current cab signal energy is at times supplied to the track rails will now be examined. These circuits include all of the elements previously described for Fig. 1,—namely: (1) an alternating current source B—C of 60 cycle per second or other commercial carrier wave frequency; (2) track transformers PTT and NTT through one or the other of which energy from this source is at proper times made available for application to the section rails; and (3) contacts 18 and 64 of the code repeater device CP which cooperate with the master code generating contacts 180a and 75a in connecting transformers PTT and NTT with the rails during the "off" portions of the positive or the negative master code periods.

Entrance of a train into the track section shown in Fig. 5 cuts off the supply of impulses of feed back energy over the section rails, and the contacts of relay KR remain in the position which they then occupy. The relay contacts, therefore, may remain in either their normal or their reverse position.

When relay KR ceases to follow code, energy is no longer supplied through transformer AT to the relay AR and its contact 35 releases to establish the circuits for supplying energy to the track transformers PTT and NTT.

If the contacts of relay KR remain in their left-hand or normal positions, an impulse of energy will be supplied from transformer PTT to the section rails during each positive period in the code. Under these conditions each time the contacts of the active coder pick up an impulse of energy is supplied from the battery TP to the section rails, while energy is supplied to relay CP to cause movement of its contacts to their left-hand or normal positions. As soon as the contacts of relay CP shift to their normal positions, contact 7 interrupts the supply of energy from battery TP to the section rails, while contact 18 establishes the circuit to supply energy from transformer PTT to the section rails. This circuit is traced from one terminal of the secondary winding of transformer PTT over wire 22, normal polar contact 18 of relay CP, normal polar contact 58 of relay KR, and resistance 12 to rail 2, while the other terminal of the transformer secondary winding is connected over wire 20, front contact of the active coder, contact 17a of relay H, and wire 11 to rail 1.

On release of the coder contact the circuit traced above for supplying energy from transformer PTT to the section rails is interrupted, while a circuit is established to supply energy from battery TN to the section rails, and a circuit is established to supply energy to relay CP to cause its contacts to move to their reverse position to interrupt the supply of energy from battery TN to the section rails.

On the next movement of the coder contacts to their picked up positions energy is again supplied from battery TP to the section rails, while energy is supplied to relay CP to cause its contacts to move to their normal positions to interrupt the supply of energy from the battery TP to the section rails and to establish the circuit to supply energy from the transformer PTT to the section rails.

Accordingly, when relay KR ceases to operate with its contacts in their normal positions, impulses of master code of both positive and negative polarity continue to be supplied to the section rails, while during each positive period in the master code energy is supplied from the transformer PTT to the section rails.

When the contacts of relay KR are in their normal positions, contact 58 interrupts the circuit of the secondary winding of transformer NTT to thereby prevent the supply of energy from this transformer to the section rails. In addition, when the contacts of relay KR are in their normal positions, contact 52 prevents the supply of energy from transformer PTT to the winding of relay KR so the contacts of relay KR will not be operated by energy supplied from transformer PTT.

When the track section is vacated the impulses of master code supplied to the section rails feed to the track relay and operate it to cause feed back energy to be supplied to the section rails. The first impulse of feed back energy of negative polarity supplied to the section rails will cause movement of the contacts of relay KR from their normal to their reverse position with resultant supply of an impulse of energy through transformer AT to relay AR. On this movement of the contacts of relay KR, its contact 58 interrupts the circuit of transformer PTT and establishes the circuit of transformer NTT.

The impulse of master code following the impulse of feed back code of negative polarity will be of positive polarity, but as the circuit of transformer PTT has been interrupted by contact 58 of relay KR, energy will not be supplied from transformer PTT to the section rails during the period following the supply of an impulse of master code of positive polarity to the section rails. Accordingly, when this impulse of master code feeds to the track relay the impulse of feed back energy of positive polarity supplied to the section rails will feed to the relay KR without interference which would result if alternating current were being supplied to the section rails. This impulse of feed back energy will cause the contacts of relay KR to move to their left-hand or normal positions, and on this movement of the contacts of the relay KR another impulse of energy is supplied through transformer AT to the relay AR, and its contacts pick up, if they did not become picked up as a result of the supply of the first impulse of energy to the relay.

When relay AR picks up its contact 35 interrupts the supply of energy to transformers PTT and NTT and thus cuts off the supply of alternating current energy to the section rails, while master code and feed back energy continue to be supplied over the section rails so that relay AR is maintained picked up.

The equipment operates in a similar manner if when a train enters the section the contacts of relay KR remain in their right-hand or reverse positions. When relay KR ceases to follow code relay AR releases and its contact 35 establishes the circuits of the transformers PTT and NTT.

As the contacts of relay KR are assumed to be in their reverse position contact 58 interrupts the circuit of transformer PTT and establishes the circuit of transformer NTT, and energy will be supplied from transformer NTT to the section rails during the negative periods in the master code.

On release of the contacts of the active coder, a circuit is established to supply energy from battery TN to the section rails, and to supply energy to relay CP to cause its contacts to move to their right-hand or reverse positions so that contact 7 interrupts the circuit for supplying energy from battery TN to the section rails.

In addition, on movement of the contacts of relay CP to their right-hand or reverse positions contact 64 establishes the circuit to supply energy from transformer NTT to the section rails. This circuit is traced from one terminal of the secondary winding of transformer NTT through reverse polar contact 58 of relay KR and wire 13 to track rail 2, and from the other terminal of the secondary winding of transformer NTT through reverse polar contact 64 of relay CP, wire 56, back contact 75a or 180a of one of the coders, contact 17a of relay H, and wire 11 to track rail 1.

At this time contact 52 of relay KR interrupts the circuit of relay KR so that on the supply of energy from transformer NTT to the section rails energy will not be supplied from transformer NTT to the winding of relay KR.

On picking up of the contacts of the active coder the circuit for supplying energy from the transformer NTT to the section rails is interrupted, while a circuit is established to supply energy from battery TP to the section rails and to supply energy to relay CP to cause its contacts to move to their left-hand or normal positions. On this movement of the contacts of relay CP contact 7 interrupts the circuit of the battery TP, while contact 64 additionally interrupts the circuit of transformer NTT.

At this time normal polar contact 18 is closed, but energy is not supplied from transformer PTT to the section rails since contact 58 of relay KR is assumed to be in its right-hand or reverse position. As the circuit of the secondary winding of transformer PTT is incomplete, energy will not be supplied from the transformer to relay KR, even though reverse polar contact 52 of relay KR and normal polar contact 48 of relay CP are closed.

On subsequent release of the contacts of the active coder energy is again supplied from battery TN to the section rails, while energy is supplied to relay CP to cause its contacts to move to their reverse positions to interrupt the circuit of battery TN and to establish the circuit for supplying energy from transformer NTT to the section rails.

On continued operation of the equipment when the section is occupied impulses of master code of both positive and negative polarity are supplied to the section rails, while an impulse of alternating current energy is supplied from transformer NTT to the section rails during each negative period in the code.

When the section is vacated master code feeds to the track relay and operates it so that impulses of feed back energy are supplied to the section rails. A positive impulse of feed back energy will be supplied to the section rails following a positive impulse of master code, at which time the contacts of relay CP are in their normal positions and the contacts of the active coder are picked up. Accordingly, the positive impulse of feed back energy will be supplied to relay KR over the circuit which is traced from rail 1 through wire 11, contact 17a of relay H, front contact 75a or 180a of the active coder, wire 20, normal polar contact 48 of relay CP, wire 51, reverse polar contact 52 of relay KR, wire 53, winding of relay KR, and wires 54 and 13 to rail 2. This energy will cause movement of the contacts of relay KR to their normal positions with resultant interruption of the circuit of transformer NTT so that energy will not be supplied from the transformer NTT to the section rails during the next negative period in the code. As a result the next impulse of feed back energy, which will be of negative polarity, will feed to relay KR and move its contacts to their reverse positions.

On movement of the contacts of relay KR between their two positions energy is supplied through the transformer AT to the relay AR and its contact 35 is picked up to interrupt the circuits of transformers NTT and PTT and thus discontinue the supply of alternating current energy to the section rails.

It will be seen, therefore, on entrance of a train into the section so that the supply of impulses of feed back energy over the section rails is cut off, the relay AR releases and establishes the circuits of the transformers NTT and PTT so that energy is supplied to the track rails from one or the other of these transformers, the one depending on the position occupied by the contacts of the relay KR.

If the contacts of relay KR occupy their normal positions energy will be supplied from the transformer PTT to the section rails during the positive periods in the code, while if the contacts of relay KR occupy their reverse positions energy will be supplied from transformer NTT to the section rails during the negative periods in the code.

In addition it will be seen that the operation of the equipment is such that when the section is vacated feed back energy feeds to the relay KR during the portion of the code cycle in which alternating current is not being supplied to the section rails so the relay KR will respond to the impulses of feed back energy and cause relay AR to be picked up to discontinue the supply of cab signal energy to the section rails.

In the diagram forming Fig. 6 of the drawings alternating current cab signal energy is shown supplied to the section rails during the negative or the positive periods in the code. As has been explained above, energy will be supplied during one or the other of these periods, the one depending on the position occupied by the contacts of relay KR.

*Track circuit of Fig. 7*

The track circuit shown in Fig. 1 is arranged so that during each "positive" period in the master code, an impulse of alternating current cab signal control energy is supplied to the section rails to operate the cab signal apparatus on a locomotive in the track section.

In the track circuit shown in Fig. 1 there is an interval during each "negative" period in the code during which no energy is supplied to the section rails. If desired, alternating current of a distinctive frequency, such as 100 cycles a second, may be supplied to the section rails during these periods and may be employed to operate supplemental cab signal equipment to provide an additional indication on a locomotive.

Referring to Fig. 7 there is shown therein track circuit apparatus similar to that shown in Fig. 1. The apparatus shown in Fig. 7 differs from Fig. 1 in that a second track transformer is employed. This transformer is designated TTA, while energy is supplied to the transformer primary winding from a source of alternating current of a frequency different than that of the energy supplied to transformer TT. The terminals of this source are designated BA and CA in the drawings. If energy of a frequency of 60 cycles a second is supplied to transformer TT, energy of a frequency of 100 cycles a second may be supplied to the transformer TTA.

In operation, the equipment shown in Fig. 7 operates in the same manner as that shown in Fig. 1 to cause an impulse of energy to be supplied from transformer TT to the section rails during each positive period in the code, that is, when the code transmitter contacts are picked up and the polar contacts of relay CP are in their left-hand or normal positions.

On release of the contacts of the code transmitter which has control of the relay CP, energy is supplied to the winding of relay CP to cause the contacts of the relay to move to their right-hand or reverse positions, while in the period from release of the code transmitter contact to movement of the contacts of relay CP to their reverse position an impulse of energy is supplied from battery TN to the section rails.

When the contacts of relay CP move to their reverse positions, contact 7 interrupts the supply of energy from the battery TN to the section rails, while contact 18 establishes the circuit to supply energy from transformer TTA to the section rails. This circuit is traced from track rail 2 over wires 13 and 21, reverse polar contact 18, secondary winding of transformer TTA, back contact 75a or 180a of one of the code transmitters, contact 17a of relay H, wire 11 and resistance 12 to the track rail 1. During each negative period in the code, therefore, an impulse of energy is supplied from transformer TTA to the section rails.

Accordingly, impulses of energy are supplied alternately from the transformers TT and TTA to the section rails. The energy supplied from the trasformers TT and TTA is of different frequencies and the cab signal apparatus on locomotives operated in the track stretch may be arranged to distinguish between the impulses of alternating current of the two carrier wave frequencies and to provide indications governed by this energy.

Cab signal apparatus of Fig. 8

In Fig. 8 there is shown a form of cab signal apparatus which may be employed on locomotives operated in track stretches equipped with track circuit apparatus of the type shown in Fig. 7.

The equipment shown in Fig. 8 is similar to that shown in Fig. 3 and includes an amplifier 27 which amplifies energy of 60 cycle frequency induced in the receiver coils 25 and 26 and supplies energy to operate the relay MR, while the relay MR controls relays DH and D180, as explained in connection with Fig. 3.

The equipment of Fig. 8 also includes an amplifier 27a which amplifies energy of 100 cycle frequency induced in the receiver coils 25 and 26 and supplies energy to code following relay MRA. As long as coded energy of 100 cycle frequency is supplied to the rails of the section in which a locomotive is situated, impulses of energy will be supplied to relay MRA to cause its contacts to move between their two positions and thus cause energy to be supplied through a decoding transformer to the relay CR and keep its contact 60 picked up. If energy of 100 cycle frequency is not supplied to the rails of an occupied section the relay CR will be released and its contact 60 will establish a circuit to illuminate a signal to warn the engineer of a curve or other fixed hazard.

The circuit of the curve signal may include a front contact 61 of relay DH so that the curve signal will not be lighted when the locomotive enters an occupied section or a branch track not equipped with means for supplying coded alternating track circuit energy to the section rails.

The curve signal, when displayed, indicates to the engineer that he is approaching or is in a portion of the track including a curve which requires the train speed to be reduced below that normally permitted in other portions of the track stretch. Accordingly, all of the track sections in a track stretch, except the sections including a curve or approaching a curve, may be equipped with apparatus to supply impulses of alternating current energy of 100 cycle frequency to the section rails during the negative periods in the code, and when a locomotive is in one of these sections the cab signal apparatus will function to prevent display of the curve signal. When the locomotive enters a section not equipped with means for supplying 100 cycle alternating current energy to the section rails, the relay CR releases and causes the curve signal to be displayed.

While the 100 cycle energy has been illustrated and described as means for controlling a curve or fixed hazard signal, it is not limited to use in this manner, and may be employed to provide additional proceed indications on a locomotive.

Summary

From the foregoing it will be seen that I have provided improved systems of coded track circuit signaling wherein direct current track circuits of the "polar impulse" type are supplemented by alternating current energy supply means by which "frequency code" cab signals on a train may be controlled in addition to or instead of the usual wayside signals along the trackway.

Although I have herein shown and described only a few forms of coded control circuits which embody my invention, it is understood that various changes and modifications may be made therein within the scope of the appended claims without departing from the spirit and scope of my invention.

Having thus described my invention, what I claim is:

1. In combination, a section of railway track, a positive polarity source of direct current energy and a negative polarity source of direct current energy at the exit end of said section, a coding device which repeatedly connects the rails of said section first to said positive polarity source and then to said negative polarity source and thereby produces a direct current code made up of recurring pulses of positive polarity energy that are separated by intervening pulses of negative polarity energy, a repeater relay for said coding device which with a brief delay responds to each of said rail-to-source connections that said device establishes, a contact of said repeater relay which interrupts each of said rail-to-source connections early in the code period that the connection defines and which thereby causes all of said positive polarity pulses to be much shorter than the recurring code periods during which they occur and all of said negative polarity pulses to be much shorter than the intervening code periods during which they occur, code following trackway apparatus operated by the said shortened pulses of direct current energy that said rails transmit to said section's entrance end, a source of alternating current energy at said section's exit end, means including a contact of said coding device plus a contact of said repeater relay for connecting said alternating current source in energy applying relation with said section rails during and only during the energy "off" portions of selected ones of said positive and negative direct current code periods whereby those rails are further supplied with recurring pulses of alternating current energy that interpose themselves between said direct current energy pulses, and train carried cab signaling apparatus controlled by said rail-applied pulses of said alternating current energy.

2. In combination, a section of railway track, a positive polarity source of direct current energy and a negative polarity source of direct current energy at the exit end of said section, a coding device which repeatedly connects the rails of said section first to said positive polarity source and then to said negative polarity source and thereby produces a direct current code made up of recurring pulses of positive polarity energy that are separated by intervening pulses of negative polarity energy, a repeater relay for said coding device which with a brief delay responds to each of said rail-to-source connections that said device establishes, a contact of said repeater relay which interrupts each of said rail-to-source connections early in the code period that the connection defines and which thereby causes all of said positive polarity pulses to be much shorter than the recurring code periods during which they occur and all of said negative polarity pulses to be much shorter than the intervening code periods during which they occur, code following trackway apparatus operated by the said shortened pulses of direct current energy that said rails transmit to said section's entrance end, a source of alternating current energy at said section's exit end, means including a contact of said coding device plus a contact of said repeater relay for connecting said alternating current source in energy applying relation with said section rails during and only during the energy "off" portions of said positive direct current code periods whereby those rails are further supplied with recurring pulses of alternating current energy that interpose themselves between said positive and negative pulses of direct current energy, and train carried cab signaling apparatus controlled by said rail-applied pulses of said alternating current energy.

3. In combination, a stretch of railway track, a track section included in said stretch, a positive polarity source of direct current energy and a negative polarity source of direct current energy at the exit end of said section, first and second coding contacts which respectively operate at high speed and low speed rates, means governed by one or the other of said contacts for repeatedly connecting the rails of said section first to said positive source and then to said negative source whereby to produce a direct current code made up of recurring pulses of positive polarity energy that are separated by intervening pulses of negative polarity energy, means governed by traffic conditions in advance of said section for selecting between said first and second coding contacts whereby to cause said polarized pulses of direct current energy to recur at said high speed rate at times and at said low speed rate at other times, a repeater relay for said selected coding contact which interrupts each of said contact-governed rail-to-source connections early in the code period that the connection defines and which thereby causes all of said polarized energy pulses to be much shorter than the direct current code periods during which they occur, code following trackway apparatus operated by the said shortened pulses of direct current energy that said rails transmit to said section's entrance end, a source of alternating current energy at said section's exit end, means including said selected coding contact plus a contact of said repeater relay for connecting said alternating current source in energy applying relation with said section rails during and only during the energy "off" portions of selected ones of said positive and negative direct current code periods whereby those rails are further supplied with pulses of alternating current energy which interpose themselves between said direct current energy pulses and which recur at said high speed rate at times and at said low speed rate at other times, and train-carried cab signaling apparatus controlled by said rail-applied pulses of said alternating current energy and responding distinctively to each of said two code rates at which those pulses recur.

4. In combination, a stretch of railway track, a track section included in said stretch, a positive polarity source of direct current energy and a negative polarity source of direct current energy at the exit end of said section, first and second coding contacts which respectively operate at high speed and low speed rates, means governed by one or the other of said contacts for repeatedly connecting the rails of said section first to said positive source and then to said negative source whereby to produce a direct current code made up of recurring pulses of positive polarity energy that are separated by intervening pulses of negative polarity energy, means governed by traffic conditions in advance of said section for selecting between said first and second coding contacts whereby to cause said polarized pulses of direct current energy to recur at said high speed rate at times and at said low speed rate at other times, a repeater relay for said selected coding contact which interrupts each of said contact-governed rail-to-source connections early in the code period that the connection defines and which thereby causes all of said polarized energy pulses to be much shorter than the direct current code periods during which they occur, code following trackway apparatus operated by the said shortened pulses of direct current energy that said rails transmit to said section's entrance end, a source of alternating current energy at said section's exit end, means including said selected coding contact plus a contact of said repeater relay for connecting said alternating current source in energy applying relation with said section rails during and only during the energy "off" portions of said positive direct current code periods whereby those rails are further supplied with pulses of alternating current energy which interpose themselves between said positive and negative pulses of direct current energy and which recur at said high speed rate at times and at said low speed rate at other times, and train-carried cab signaling apparatus controlled by said rail-applied pulses of said alternating current energy and responding distinctively to each of said two code rates at which those pulses recur.

5. In combination, adjoining forward and rear sections of railway track, means for supplying the rails of said forward section with direct current energy in the form of recurring pulses that have positive and negative polarities in alternating sequence and that are much shorter than the direct current code periods during which they occur, means for further supplying said forward section rails with pulses of alternating current energy which interpose themselves between said direct current energy pulses, a code following track relay for said forward section operated by said polarized pulses of direct current energy and having a contact which during such operation shifts from a first to a second position and from said second to said first position in regularly recurring manner, a repeater relay governed by said track relay and having a contact which upon each of the track relay's second contact closures moves after a brief delay from a first to a second position and which upon each of the track relay's first contact closures moves after a brief delay from said second to said first position, a positive polarity source of direct current energy and a negative polarity source of direct current energy for the rails of said rear section, connections recurrently completed by said track repeater relay contacts over which said direct current sources supply said rear section rails with energy pulses that have positive and negative polarities in alternating current sequence and that are much shorter than the direct current code periods during which they occur, a source of alternating current energy for said rear section rails, means including said track relay contact plus an added contact of said repeater relay for connecting said alternating current source in energy applying relation with said rear section rails during and only during the energy "off" portions of selected ones of said positive and negative direct current code periods whereby those rails further are supplied with pulses of alternating current energy which interpose themselves between said rear section pulses of direct current energy, and train-carried cab signaling apparatus controlled by said alternating current energy pulses which appear in the rails both of said rear section and of said forward section.

6. In combination, a section of railway track, means at the exit end of said section for supplying the section rails with master code direct current energy in the form of recurring pulses that are separated by "off" period intervals and that have positive and negative polarities in alternating sequence, means located at the entrance end of said section and operated by the there received pulses of said master code energy for further supplying said rails with direct current pulses of feed back energy that recur in step with the early portions of said master code "off" intervals and that have positive and negative polarities in alternating sequence, apparatus controlled by said polarized feed back pulses and distinctively responsive according as those pulses are or are not being received at said section's exit end, a source of alternating current energy at said section exit, means for connecting said alternating current source in energy applying relation with said section rails during and only during the latter portions of said direct current master code "off" intervals whereby those rails are further supplied with pulses of alternating current energy which interpose themselves between said direct current master and feed back pulses, and train-carried cab signaling apparatus controlled by said rail-applied pulses of said alternating current energy.

7. In combination, a section of railway track, means at the exit end of said section for supplying the section rails with master code direct current energy in the form of recurring pulses that are separated by "off" period intervals and that have positive and negative polarities in alternating sequence, means located at the entrance end of said section and operated by the there received pulses of said master code energy for further supplying said rails with direct current pulses of feed back energy that recur in step with the early portions of said master code "off" intervals and that have positive and negative polarities in alternating sequence, apparatus controlled by said polarized feed back pulses and distinctively responsive according as those pulses are or are not being received at said section's exit end, a source of alternating current energy at said section exit, means governed by said apparatus and effective only when a train in said section cuts off transmission of said feed back energy for connecting said alternating current source in energy applying relation with said section rails during the latter portions of said direct current master code "off" intervals whereby those rails then are further supplied with pulses of alternating current energy which interpose themselves between the pulses of said direct current energy, and train carried cab signaling apparatus controlled by said rail-applied pulses of said alternating current energy.

8. In combination, a section of railway track over which are operated locomotives equipped with signaling apparatus responsive to the presence of coded alternating current in the track rails, a coding relay having contacts continuously actuated between a first and a second position, a slow acting repeater relay having contacts movable between a first and a second position, said repeater relay being controlled by said coding relay so that the contacts of the repeater relay move to their first or their second position according as the contacts of said coding relay move to their first or their second position, means effective when the contacts of the coding device are in their first position and of the repeater relay are in their second position to supply to the section rails direct current of normal polarity, means effective when the contacts of the coding device are in their second position and the contacts of the repeater relay are in their first position to supply to the section rails direct current of reverse polarity, a track relay responsive to the impulses of direct current supplied to said section rails, and means effective when the contacts of the coding device and of the repeater relay are in their first positions to supply alternating current to the section rails.

9. In combination, a section of railway track over which are operated locomotives equipped with signaling apparatus responsive to the presence of coded alternating current in the track rails, a coding relay having contacts continuously actuated between a first and a second position, a slow acting repeater relay having contacts movable between a first and a second position, said repeater relay being controlled by said coding relay so that the contacts of the repeater relay move to their first or their second position according as the contacts of said coding relay move to their first or their second position, means effective when the contacts of the coding device are in their first position and the contacts of the repeater relay are in their second position to supply to the section rails direct current of normal polarity, means effective when the contacts of the coding device are in their second position and the contacts of the repeater relay are in their first position to supply to the section rails direct current of reverse polarity, a track relay responsive to the impulses of direct current supplied to said section rails, means effective when the contacts of the coding device and of the repeater relay are in their first positions to supply alternating current of a first frequency to the section rails, and means effective when the contacts of the coding device and of the repeater relay are in their second positions to supply alternating current of a second frequency to the section rails.

HOWARD A. THOMPSON.